US009933334B2

(12) United States Patent
Rivellini (10) Patent No.: US 9,933,334 B2
(45) Date of Patent: Apr. 3, 2018

(54) CYLINDER HEAD ACCELERATION MEASUREMENT FOR VALVE TRAIN DIAGNOSTICS SYSTEM AND METHOD

(71) Applicant: General Electric Company, Schenectady, NY (US)

(72) Inventor: Sandro Rivellini, Jenbach (AT)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 14/745,986

(22) Filed: Jun. 22, 2015

(65) Prior Publication Data
US 2016/0370254 A1    Dec. 22, 2016

(51) Int. Cl.
| | | |
|---|---|---|
| *G01M 15/05* | (2006.01) | |
| *G01M 15/06* | (2006.01) | |
| *G01M 15/11* | (2006.01) | |
| *F02D 41/00* | (2006.01) | |
| *F02D 41/22* | (2006.01) | |
| *F02D 35/02* | (2006.01) | |

(52) U.S. Cl.
CPC ........... *G01M 15/05* (2013.01); *F02D 35/027* (2013.01); *F02D 41/009* (2013.01);
(Continued)

(58) Field of Classification Search
CPC ...... G01M 15/05; G01M 15/06; G01M 15/11; F02D 35/027; F02D 41/009;
(Continued)

(56) References Cited

U.S. PATENT DOCUMENTS 4,483,185 A * 11/1984 Kunzfeld ................. F01L 1/20
73/114.79
4,995,365 A *  2/1991 Denz .................... G01M 15/106
123/479
(Continued)

FOREIGN PATENT DOCUMENTS

CN          203480037          3/2014
DE          19917772 A1       10/2000
(Continued)

OTHER PUBLICATIONS

PCT Search Report and Written Opinion issued in connection with corresponding PCT Application No. PCT/US16/034204 dated Aug. 22, 2016.
(Continued)

*Primary Examiner* — Thomas Moulis
*Assistant Examiner* — John Bailey
(74) *Attorney, Agent, or Firm* — Fletcher Yoder, P.C.

(57) ABSTRACT

In one embodiment, a system includes an engine control system configured to control an engine. The engine control system comprises a processor configured to receive a vibration signal sensed by a knock sensor disposed in an engine, and to receive a crankshaft signal sensed by a crank angle sensor disposed in the engine, wherein the crankshaft signal is representative of an engine crank angle. The processor is further configured to monitor a valve timing by deriving a cylinder head acceleration measurement via the vibration signal received by the knock sensor, wherein the processor is configured to monitor the valve timing by deriving a valve lash based on the vibration signal, the engine crank angle, and a threshold valve lash model.

17 Claims, 7 Drawing Sheets

(52) U.S. Cl.
CPC ......... *F02D 41/0097* (2013.01); *F02D 41/22* (2013.01); *G01M 15/06* (2013.01); *G01M 15/11* (2013.01); *Y02T 10/40* (2013.01)

(58) Field of Classification Search
CPC .................. F02D 41/0097; F02D 41/22; F01L 2009/0455; F01L 2001/2433; F01L 2109/00; F01L 1/14; F01L 1/24; F01L 1/20; F01L 1/22
USPC .......... 123/613, 631, 339.15, 351, 395, 397, 123/690, 479, 359, 406.29, 90.43, 90.45; 701/107, 114, 32.8, 34.4; 73/35.01, 73/114.27, 114.28, 114.01, 114.61, 73/114.71, 114.72, 114.73, 114.22, 73/114.23, 114.35, 114.78, 73/114.02–114.09, 114.11, 114.12; 464/1; 33/601, 605
See application file for complete search history.

(56) References Cited

U.S. PATENT DOCUMENTS

| | | | |
|---|---|---|---|
| 5,029,565 A | 7/1991 | Talbot | |
| 5,111,790 A | 5/1992 | Grandy | |
| 5,115,778 A | 5/1992 | Holroyd | |
| 5,119,783 A | 6/1992 | Komurasski | |
| 5,241,480 A | 8/1993 | Takaku et al. | |
| 5,257,533 A | 11/1993 | Imada | |
| 5,337,240 A | 8/1994 | Nakagawa et al. | |
| 5,339,245 A | 8/1994 | Hirata et al. | |
| 5,361,213 A | 11/1994 | Fujieda et al. | |
| 5,392,642 A | 2/1995 | Tao | |
| 5,400,648 A | 3/1995 | Mahr | |
| 5,452,699 A | 9/1995 | Rossignol | |
| 5,467,638 A | 11/1995 | Philipp | |
| 5,594,649 A | 1/1997 | Cook et al. | |
| 5,693,936 A | 12/1997 | Komachiya et al. | |
| 5,763,769 A | 6/1998 | Kluzner | |
| 5,797,360 A * | 8/1998 | Pischinger | F01L 9/04 123/90.11 |
| 5,837,887 A | 11/1998 | Shibata et al. | |
| 5,905,193 A | 5/1999 | Hashizume et al. | |
| 5,932,801 A | 8/1999 | Akishita et al. | |
| 5,934,256 A | 8/1999 | Wenzlawski et al. | |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,330,877 B1 | 12/2001 | Nordin | |
| 6,336,355 B1 | 1/2002 | Sasaki et al. | |
| 6,550,311 B2 | 4/2003 | Sloboda | |
| 6,598,468 B2 | 7/2003 | Zur Loye et al. | |
| 6,662,781 B1 | 12/2003 | Tomo et al. | |
| 6,814,054 B2 | 11/2004 | Sauler et al. | |
| 6,862,517 B2 | 3/2005 | Galtier | |
| 6,885,932 B2 | 4/2005 | Liu et al. | |
| 6,912,460 B2 | 6/2005 | Sauler et al. | |
| 6,947,829 B2 | 9/2005 | Honda | |
| 6,973,905 B2 * | 12/2005 | Hathaway | F01L 1/146 123/90.15 |
| 6,978,771 B2 | 12/2005 | Kuzuyama et al. | |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,131,425 B2 * | 11/2006 | Ramappan | F01L 1/3442 123/406.21 |
| 7,181,338 B2 | 2/2007 | Takemura et al. | |
| 7,191,658 B2 | 3/2007 | Oda et al. | |
| 7,212,909 B2 | 5/2007 | Yoshino et | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,799 B1 * | 6/2008 | Wynveen | F01L 1/20 123/90.15 |
| 7,383,816 B2 | 6/2008 | Zurlo | |
| 7,444,231 B2 | 10/2008 | Ancimer et al. | |
| 7,444,236 B2 | 10/2008 | Wiles | |
| 7,448,254 B2 | 11/2008 | Kurtz et al. | |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Jin et al. | |
| 7,669,582 B2 | 3/2010 | Huang | |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 8,000,884 B2 | 8/2011 | Aso et al. | |
| 8,032,293 B2 | 10/2011 | Binder et al. | |
| 8,069,972 B2 | 11/2011 | Auclair et al. | |
| 8,078,389 B2 | 12/2011 | Huang et al. | |
| 8,079,261 B2 | 12/2011 | Crickmore et al. | |
| 8,108,131 B2 | 1/2012 | Huang et al. | |
| 8,150,603 B2 * | 4/2012 | Willi | F02D 13/0211 123/435 |
| 8,155,857 B2 | 4/2012 | Loeffler et al. | |
| 8,250,905 B2 | 4/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,359,909 B2 | 1/2013 | Duval et al. | |
| 8,396,649 B2 | 3/2013 | Huang | |
| 8,418,674 B2 * | 4/2013 | Yasuhara | F02D 35/028 123/299 |
| 8,463,533 B2 | 6/2013 | Glugla et al. | |
| 8,499,623 B2 | 8/2013 | Duval et al. | |
| 8,528,521 B2 | 9/2013 | Landsmann et al. | |
| 8,538,666 B2 | 9/2013 | Buslepp et al. | |
| 8,606,484 B2 | 12/2013 | Ohata | |
| 8,627,800 B2 | 1/2014 | Glugla et al. | |
| 8,639,432 B2 | 1/2014 | Matsuo et al. | |
| 8,680,707 B2 | 3/2014 | Childs et al. | |
| 8,677,975 B2 | 8/2014 | Muhammad et al. | |
| 8,849,471 B2 | 9/2014 | Daniel et al. | |
| 2002/0095978 A1 | 7/2002 | Muhlberger et al. | |
| 2003/0145813 A1 * | 8/2003 | Buhl | F01L 1/20 123/90.15 |
| 2004/0055571 A1 * | 3/2004 | Hashizume | F02D 13/023 123/406.29 |
| 2004/0139949 A1 * | 7/2004 | Koseki | F01L 1/20 123/568.14 |
| 2007/0192019 A1 * | 8/2007 | Bohnig | F02D 41/0087 701/114 |
| 2008/0091335 A1 * | 4/2008 | Takemura | G01L 23/225 701/111 |
| 2008/0120018 A1 * | 5/2008 | Wiles | F01L 1/022 701/111 |
| 2009/0024307 A1 * | 1/2009 | Bohnig | F02D 41/2416 701/104 |
| 2010/0126465 A1 * | 5/2010 | Willi | F01L 1/34 123/435 |
| 2011/0265454 A1 * | 11/2011 | Smith | F01N 3/0842 60/274 |
| 2012/0285161 A1 * | 11/2012 | Kerns | F02D 41/0087 60/598 |
| 2016/0160779 A1 * | 6/2016 | Yeager | F02D 41/009 701/103 |
| 2016/0245210 A1 * | 8/2016 | Sasaki | F02D 41/222 |
| 2017/0081992 A1 * | 3/2017 | Stenlaas | F01L 3/24 |

FOREIGN PATENT DOCUMENTS

| | | |
|---|---|---|
| DE | 10028995 A1 | 12/2001 |
| EP | 1314861 A2 | 5/2003 |
| EP | 1447654 | 8/2004 |
| EP | 1698775 | 6/2006 |
| EP | 1840360 | 3/2007 |

(56) References Cited

FOREIGN PATENT DOCUMENTS

| | | |
|---|---|---|
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jeffrey Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015 Scott K. Mann.
Reduction Piston Slap Excitation by Optimizing Piston Profiles; Takayuki Koizumi et al.; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elernents;Takeshi Nakahara et al; Proc.of SPIE 5391, Smart Struc. & Materials, Jul. 2004.

\* cited by examiner

CYLINDER HEAD ACCELERATION MEASUREMENT FOR VALVE TRAIN DIAGNOSTICS SYSTEM AND METHOD

BACKGROUND

The subject matter disclosed herein relates to cylinder head acceleration measurement, more specifically, to cylinder head acceleration measurements for valve train diagnostics.

Combustion engines will typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or move valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power. It would be beneficial to improve valve train diagnostics.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an engine control system configured to control an engine. The engine control system comprises a processor configured to receive a vibration signal sensed by a knock sensor disposed in an engine, and to receive a crankshaft signal sensed by a crank angle sensor disposed in the engine, wherein the crankshaft signal is representative of an engine crank angle. The processor is further configured to monitor a valve timing by deriving a cylinder head acceleration measurement via the vibration signal received by the knock sensor, wherein the processor is configured to monitor the valve timing by deriving a valve lash based on the vibration signal, the engine crank angle, and a threshold valve lash model.

In a second embodiment, a method includes sensing an engine vibration via a knock sensor, and sensing an engine crank angle via a crank angle sensor. The method further includes monitoring a valve timing by deriving a cylinder head acceleration measurement via the engine vibration sensed by the knock sensor, wherein deriving cylinder head acceleration measurement comprises deriving a valve lash based on the sensed engine vibration, the engine crank angle, and a threshold valve lash model.

In a third embodiment, a tangible, non-transitory computer readable medium storing code is configured to cause a processor to sense an engine vibration via a knock sensor, and to sense an engine crank angle via a crank angle sensor. The code is further configured to cause the processor to monitor a valve timing by deriving a cylinder head acceleration measurement via the vibration signal received by the knock sensor, wherein the processor is configured to monitor the valve timing by deriving a valve lash based on the vibration signal, the engine crank angle, and a threshold valve lash model.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein include the use of one or more knock sensor systems and methods that may detect a dynamic response of a cylinder head caused by intake valve and exhaust valve seating excitation. Valve excitation may occur as a valve, such as a conic or circular valve, "seats" or otherwise closes a cylinder chamber with certain valve portions seating before others. Advantageously, the techniques described herein include the retrofit of existing systems, such as upgrading an existing engine control unit (ECU) or engine control module (ECM), to use existing knock valve systems to derive intake valve and/or exhaust valve conditions, including a derivation of variations in valve timing for each cylinder of a combustion or reciprocating engine. Such derivations may be used to further derive certain valve conditions, such as stuck valves, disconnected valve stems, valve train structural failure, and so on, and thus may be used to improve engine maintenance and overall operations. Accordingly, valve timing may be monitored by observing cylinder head acceleration measurement, via, for example, a knock sensor, for remote valve train diagnostics.

In one embodiment, the techniques described herein may detect a timing drift of cylinder head response due to the valve seating excitation in order to derive a drift of the valves' closing phase due to, for example, a valve lash (e.g. clearance or gap in a valve train between camshaft and the valve) variation or a valve stem disconnection. The detection of the timing drift may include using statistical techniques, as described in further detail below, useful in analyzing knock sensor data using a variety of sensors, including standard knock sensors positioned to detect engine knocking. Accordingly, the retrofit may apply a software update (e.g., flash update) and may not involve hardware changes. Acceleration sensors can measure a cylinder head dynamic response due to valve seating excitation. A trigger Crank Angle (CA) of the signal determines the actual valve closing event and can be correlated to valve lash in operation. Variation of the trigger CA allows a determination of variation in actual valve closing time. This determination can be used to detect at least two types of failure modes: 1) lash variation in operation, resulting in slow drift over time of trigger CA, e.g., valve wear progression (wear=lash adjustment–lash in operation), loosen adjusting screw, variation in valve train components thermal expansion; and 2) valve train failure, e.g., resulting in sudden valve timing variation; independently from the valve lash in operation, including valve disengagement, connecting rod breakage, and so on. The techniques described herein include results independent from a type of acceleration sensor used (e.g., piezoelectric, charge accelerometer) and position of the acceleration sensor on a cylinder head (e.g., sensor may be used in one or more cylinder head studs).

Accordingly, the techniques described herein may provide for condition based maintenance of engines with improved efficiency and cost. Remote and local detection of certain undesired maintenance events, such as a valve train events, may be provided, thus minimizing further issues and increasing engine availability and reliability. The techniques described herein may additionally include systems and method for creating various maintenance models (e.g., statistical models) that may be suitable for applying to knock sensor data to detect and/or predict the undesired maintenance events (e.g., valve sticking, valve disconnection, excessive valve timing drift, excessive valve seating velocity, complete valve lash consumption in operation).

Figure 1:
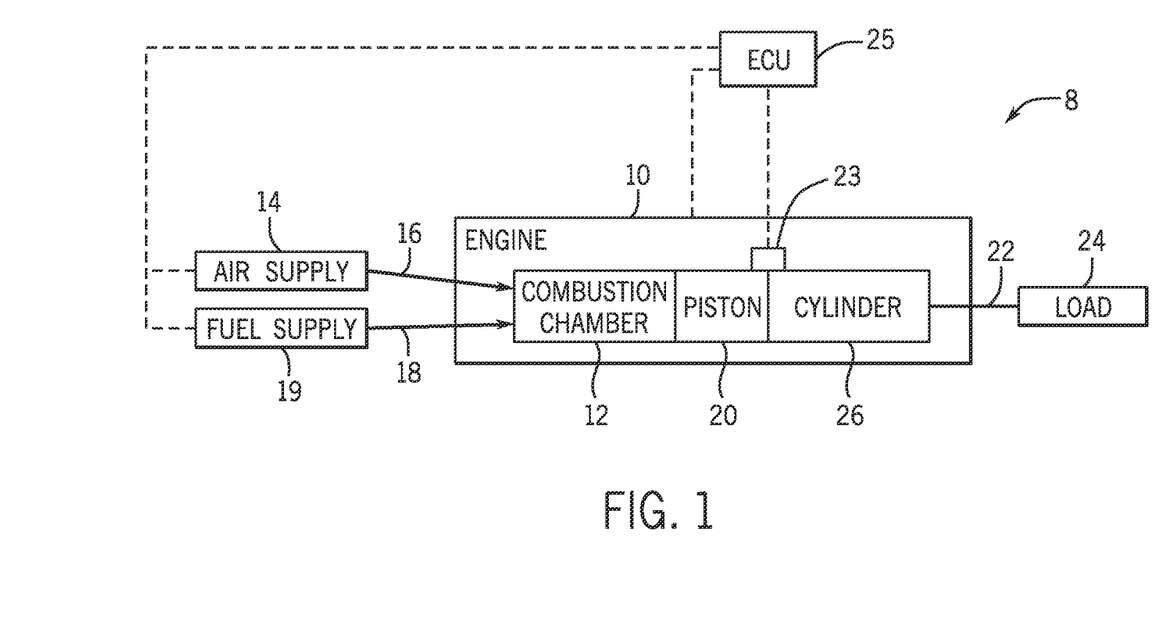
FIG. 1 is a block diagram of an embodiment of a power production system including an internal combustion engine.

FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12).). A top portion of the combustion chamber 12 may be formed via a cylinder head 14. Though FIG. 1 shows a combustion engine 10, it should be understood that any reciprocating device may be used. An air supply is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may be any sensor configured to sense vibrations caused by the engine 10, such as vibration due to detonation, pre-ignition, and or pinging. The knock sensor 23 is shown communicatively coupled to a controller, engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain vibrations should be further analyzed and categorized to detect, for example, undesired engine conditions.

Figure 2:
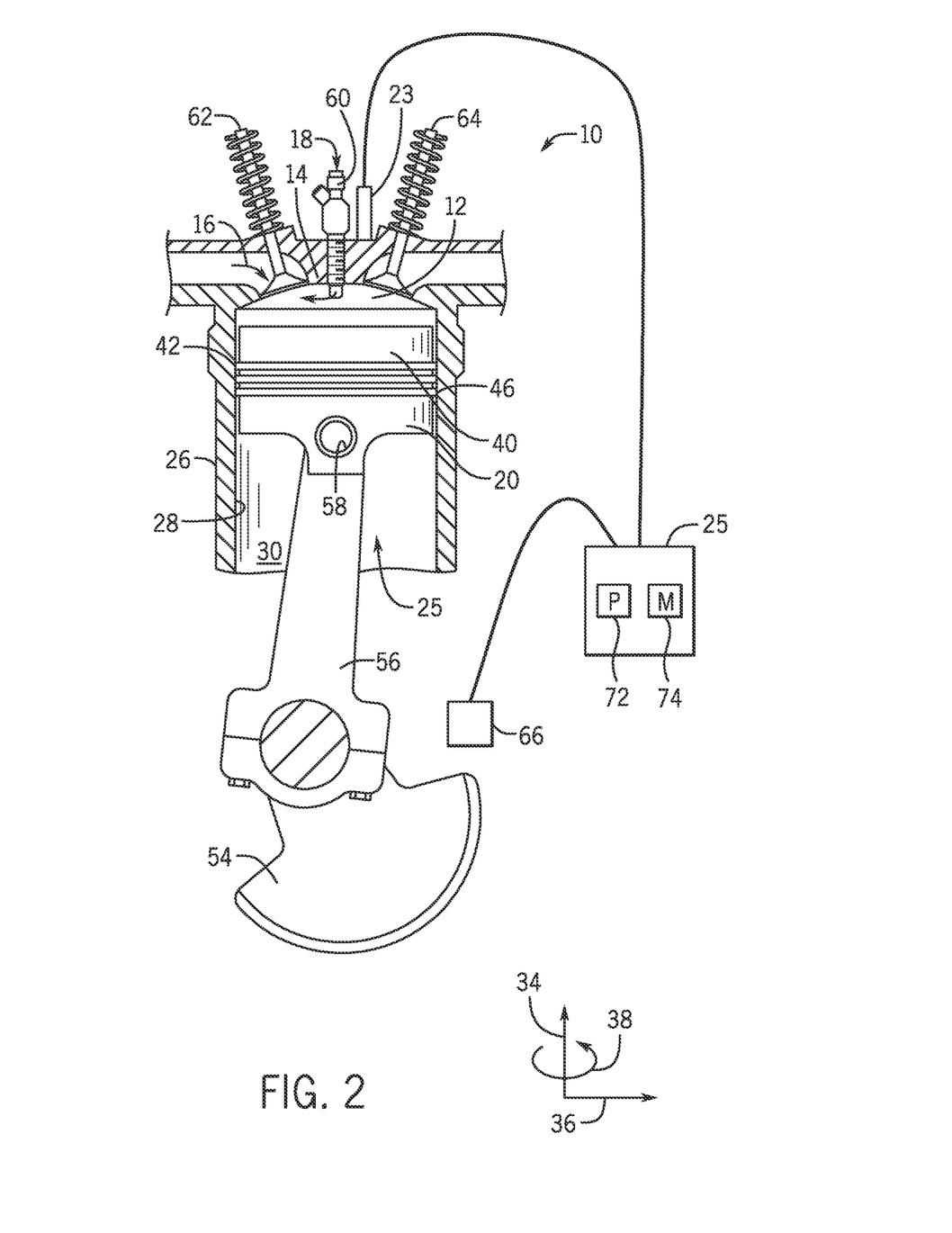
FIG. 2 is a block diagram of an embodiment of the internal combustion engine of FIG. 1, including a cylinder and a piston.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 also includes a crankshaft sensor 66, the knock sensor 23, and the engine control unit (ECU) 25, which includes a processor 72 and memory 74. The crankshaft or crank angle sensor 66 senses the position and/or rotational speed of the crankshaft 54. Accordingly, a crank angle or crank timing information may be derived via then crankshaft sensor 66. That is, when monitoring combustion engines, timing is frequently expressed in terms of crankshaft 54 angle. For example, a full cycle of a four stroke engine 10 may be measured as a 720° cycle. The knock sensor 23 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 23 may not be a knock sensor, but any sensor that may sense noise, vibration, pressure, acceleration, deflection, and/or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23. The crankshaft sensor 66 and the knock sensor 23 are shown in electronic communication with the engine control unit (ECU) 25. The ECU 25 includes a processor 72 and a memory 74. The memory 74 may store computer instructions that may be executed by the processor 72. The ECU 25 monitors and controls and operation of the engine 10, for example, by adjusting combustion timing, valve 62, 64, timing, adjusting the delivery of fuel and oxidant (e.g., air), and so on.

Figure 3:
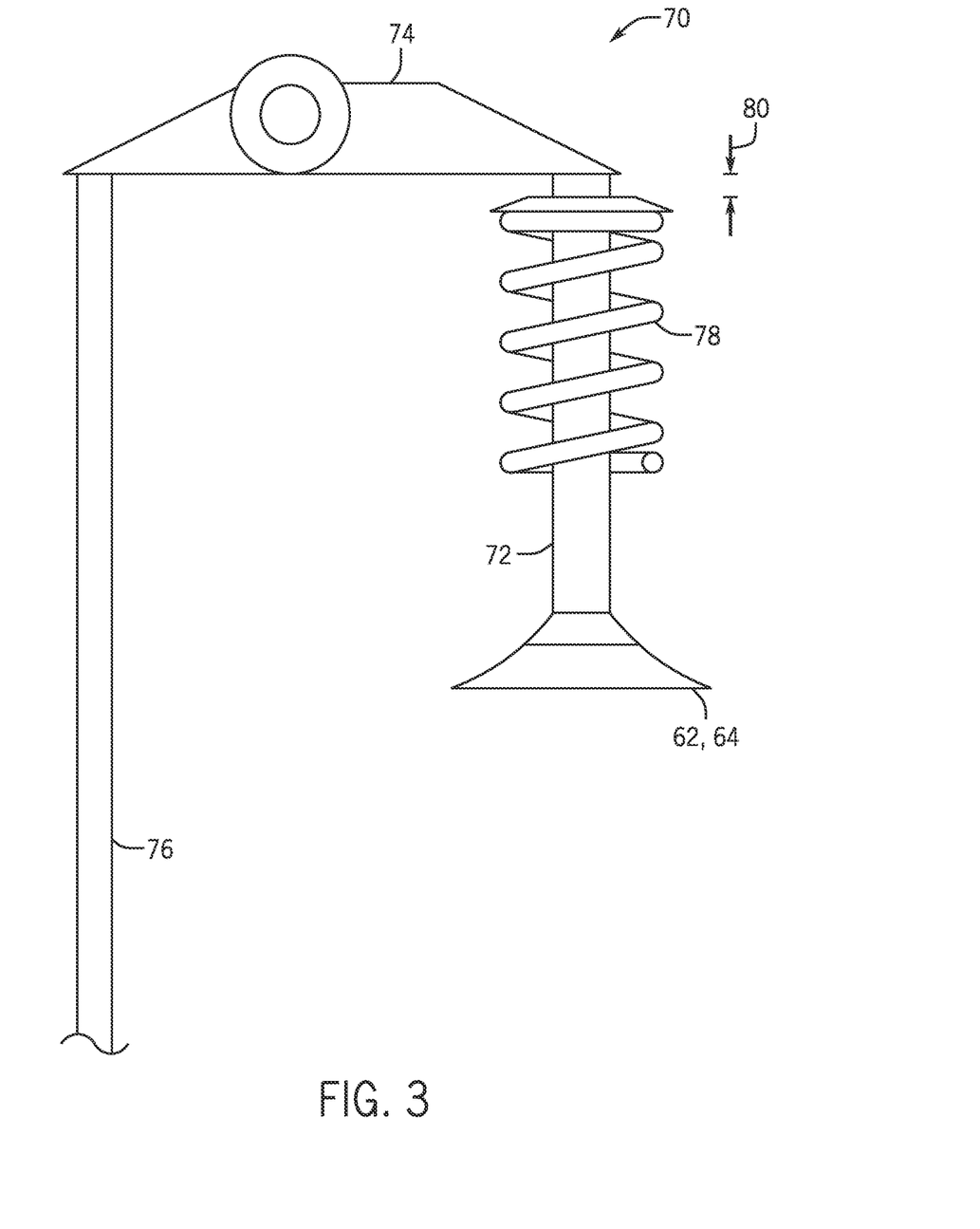
FIG. 3 is a block diagram of an embodiment of a valve train having a valve lash.

Turning now to FIG. 3, an embodiment of a valve train 70 is depicted. The valve train 70 includes either one of the valves 62, 64 having a valve stem 72. The valve stem 72 (e.g., tappet or "stultze") may be mechanically coupled to a rocker arm 74, which may move (e.g., open or close) the valve 62, 64 during operations of the engine 10. A rod 76 is also shown mechanically coupled to the rocker arm 74 and suitable for connecting the rocker arm to the engine 10, thus transferring motive force into the valve train 70. A spring 78 is also depicted, which provides a bias force to the valve 62, 64 to aid in opening and/or closing of the valve 62, 64. A valve lash (e.g., clearance or distance) 80 between the valve stem 72 and the rocker arm 74 is illustrated. During operations, the valve lash 80 may "drift" or otherwise increase or decrease in size. The techniques described herein may use the knock sensor(s) 23 to derive and analyze valve lash 80 drift over time, and to derive and analyze other valve train 70 properties, and may provide for a condition based maintenance (CBM) approach to valve train 70 maintenance as opposed to a scheduled approach where the valve train 70 may be adjusted based on number of operating hours. The scheduled approach may be more inefficient than the CBM approach detailed herein because the scheduled approach may adjust before and/or after the valve train 70 is operating outside a desired adjustment range.

Advantageously, it has been discovered that valve train 70 conditions may be derived based on signals from the knock sensor(s) 23. For example, a dynamic response of the cylinder head 14 caused by intake valve 62 and/or exhaust valve 64 seating excitation, may be detected by the knock sensor(s) 23 and used to derive a variety of valve train 70 conditions, including valve lash 80 drift. In one example, a magnitude (e.g., |F| where F is a frequency domain) and a phase (e.g., $\Phi$ (F)) of a dynamic response of the cylinder head 14 measured by one or more accelerometers in a crank angle range (e.g., between −720° to 720°) contain information regarding the valves 62, 64 seating excitation force and timing respectively. Triggered crank 54 angle of the absolute acceleration signal may be a robust information correlative to the valves' 62, 64 timing, which may be monitored during operations to detect long term valve lash 80 drift (e.g., drift after approximately 100, 500, 1000, 2000, 2500, 3000, or more operating hours) and sudden valve train events such as the stem 72 disconnection (e.g., between two consecutive cycles). Several types of models may then be derived to detect valve train 70 conditions (e.g., valve lash 80 drift, valve stem 72 disconnection).

The models may include one or more valve noise models that analyze valve knock sensor signals without considering triggered (e.g., opening) crank angle degree information. The models may additionally include triggered crank angle degree models that incorporate triggered crank angle degree information in addition to knock sensor(s) signals. The models (e.g., noise models and triggered crank angle modes) may be used individually or in combination, to derive the valve train conditions.

Figure 4:
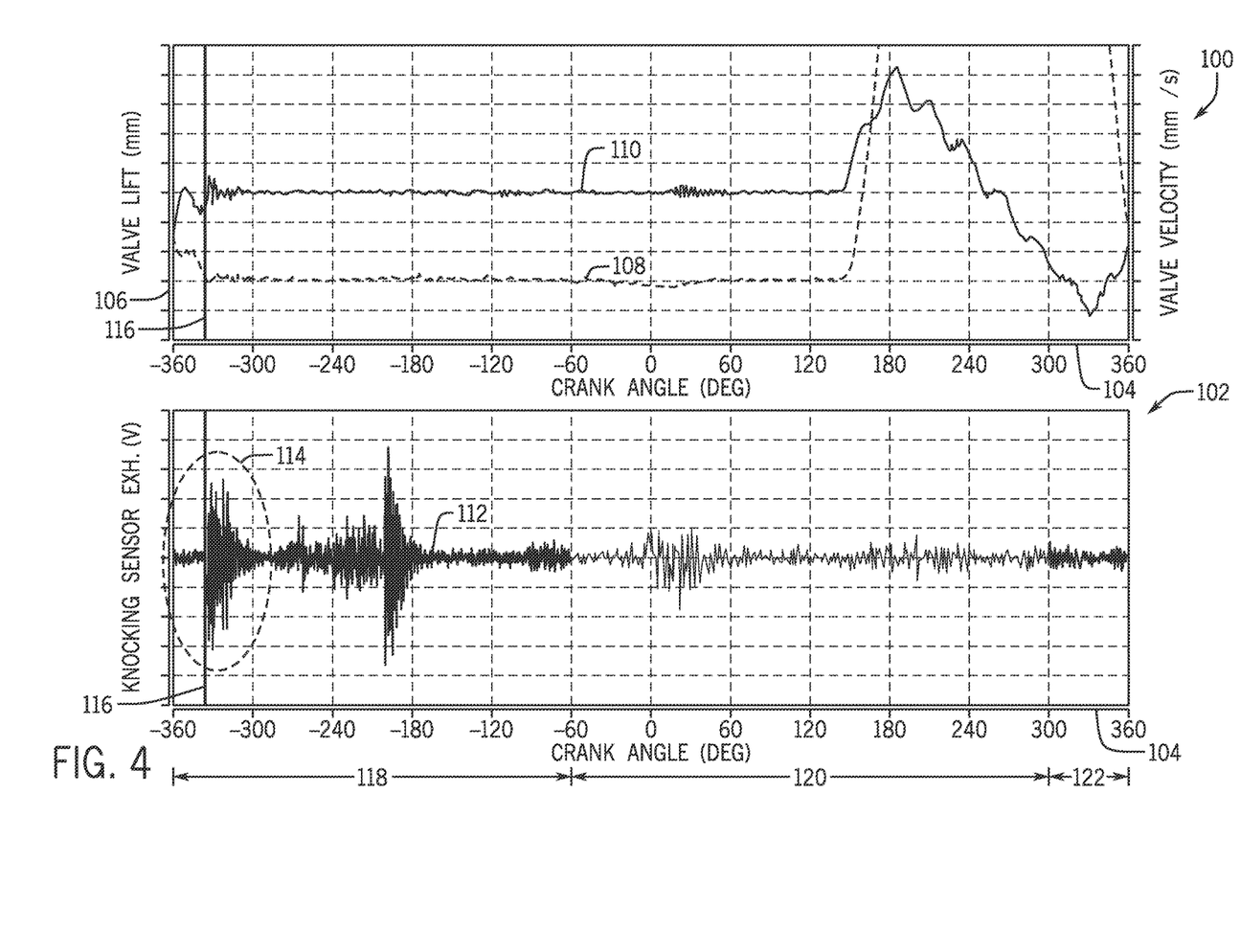
FIG. 4 illustrates an embodiment of charts depicting valve lift and velocity (top chart) and cylinder head vibration signal (valve noise) (bottom chart)

For example, FIG. 4 depicts embodiments of two charts 100 and 102 that share the same x-axis 104. The chart 100 includes a dynamic valve lift in a thermodynamic cycle vs. crank angle in the x-axis 104 with corresponding measured valve lift data in a y-axis 106. The chart 102 is correlative to the chart 100 and includes the same crank angle degree x-axis 104. The top chart 100 includes signals or curves 108 and 110, where curve 108 is measured valve lift while curve 110 is valve velocity (e.g., derivative of valve lift 108 over time). The chart 102 includes a signal 112 (e.g., vibration or noise signal) representative of the dynamic response of the cylinder head 14 as measured by the knock sensor(s) 23. While the signal 112 is typically used to detect knock (e.g., engine "pinging"), it has been found that the signal 112 includes components representative of, for example, the valves 62, 64 contacting seat rings and/or other valve train 70 components. A decay 112 portion of the signal 112, such as decay noise 114 of the cylinder head 14 may be used to extract valve train 70 dynamics.

In the depicted embodiment, a valve closing event 116 is identified and the dynamic noise response signal 112 captured by the knocking sensor may include data representative of, for example, valve timing which can be correlated to the actual valve lash 80 in operation. Monitoring valve timing drift can be used to optimize service adjustment interval, detect early valve and seat ring life and/or valve train structure failure (like valve stem 72 disengagement). To derive the valve lift event 116, the noise signal 112 may be analyzed to look for a pattern representative of a start if the dynamic portion 114 shown. In order to derive a model suitable for identifying certain valve train 70 conditions, (e.g., valve lash 80 drift, valve stem 70 disconnection), a test bed may be used to sense vibration and acceleration of the engine 10. For example, one or more vibrometers (e.g., differential laser vibrometers) and one or more accelerometers may be used to capture valve seating data 108, 110 and valve noise data 112; and the crank angle sensor 66 may provide crank angle data to define the x-axis 104. Measurements may be taken in steps, such as a first step that provides for natural frequency identification of the signals 108, 110, and/or 112. For example, certain angles 118, 120, 122 may each include a respective natural frequency F and associated phase Φ (F).

A full load operations second step may also be used to observe the engine 10 during full load. The full load operation may be further subdivide into a first phase that observes during operation of two or more exhaust (or intake) valves 62, 64 per cylinder and a second phase that observes operations of a single exhaust (or intake) valve 62, 64 per cylinder. The observations 108, 110, 112 may then be used to derive certain graphs or models, such as the graphs depicted in FIGS. 5 and 6. In one example, a magnitude (e.g., |F| where F is a frequency domain) and a phase (e.g., Φ (F)) of a dynamic response of the cylinder head 14 measured by one or more sensors 23 in a crank angle range (e.g., between −720° to 720°) contain information regarding the valves 62, 64 seating excitation force and timing respectively, and may thus be used to create the graphs or models of FIGS. 5 and 6.

Figure 5:
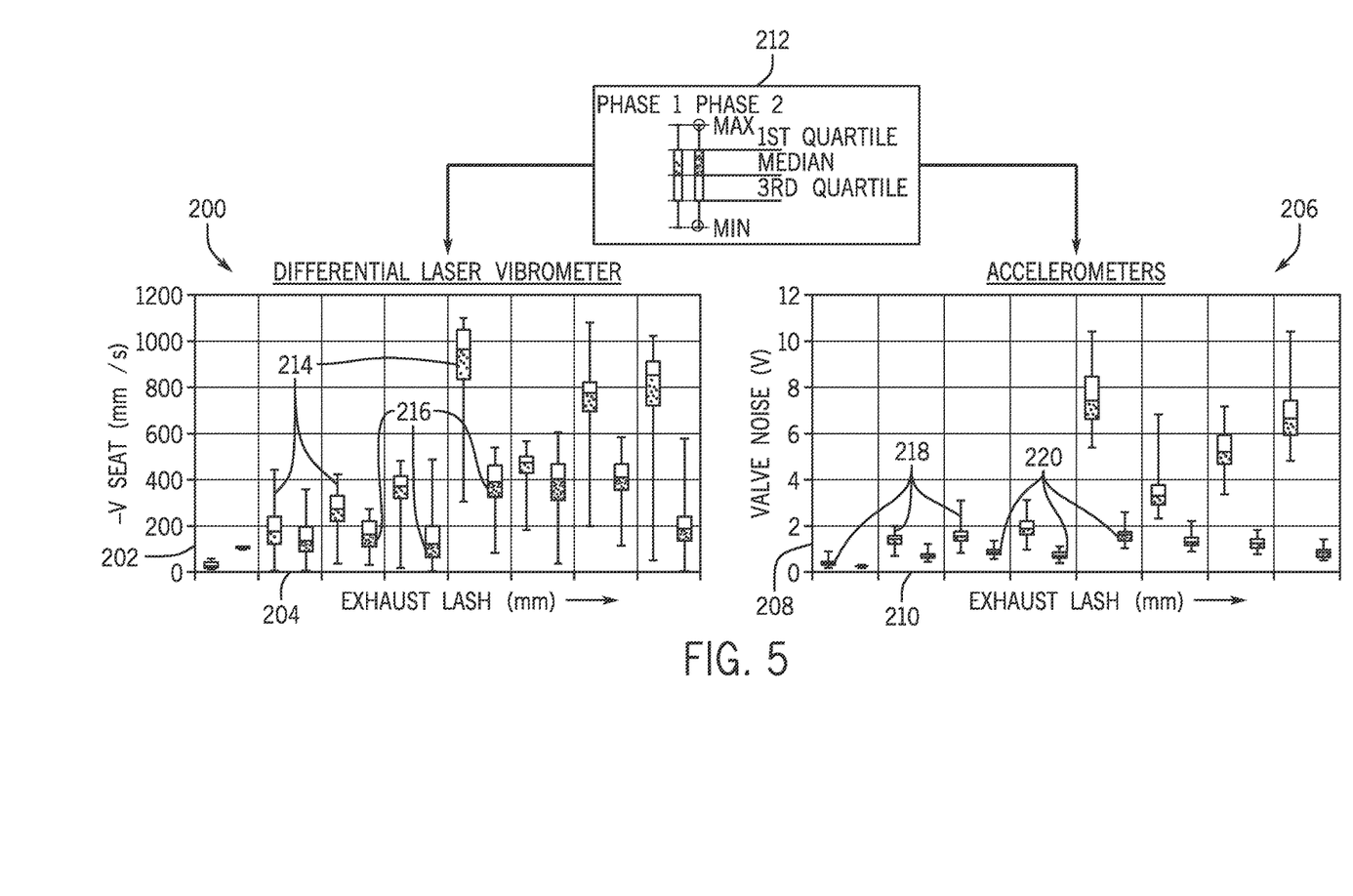
FIG. 5 illustrates an embodiment of charts depicting derived valve lash versus valve seating velocity and valve noise.

More specifically, FIG. 5 shows an embodiment of a graph 200 depicting valve seating velocity change (e.g., mm/s in a y-axis 202) and exhaust lash (e g mm in an x-axis 204). A second graph 206 included in FIG. 5 depicts a valve noise (measured as maximum of cylinder head accelerometer signal around the valve closing time) in a y-axis 208 and exhaust lash (e.g. mm in an x-axis 210). Graph 200 may be derived base on vibrometer data while graph 206 may be derived based on accelerometer data. A legend 212 shows max, min, and quartiles for boxes 214, 216, 218, and 220 of the graphs 200 and 206. In the depicted examples, graph 200 is a box plot that includes boxes 214 representative of a first analysis phase (e.g., analysis phase using two exhaust valves 64 or two intake valves 62) and boxes 216 representative of a second analysis phase (e.g., analysis phase using a single exhaust valve 64 or a single intake valve 62). Likewise, graph 206 is a box plot having boxes 218 analyzed during the first analysis phase and boxes 220 analyzed during the second analysis phase.

As can be observed in graph 200, as lash (x-axis 204) increases (e.g., drifts) the valve seating excitation (y-axis 202) also increases. However, using only vibrometer data may not be as precisely correlative to (or predictive of) valve lash 80 and/or valve lash 80 drift as desired. Likewise, graph 206 shows that as lash (x-axis 210) increases valve noise (y-axis 208) also increases due to higher valve seating excitation. However, noise data may also not be as precisely correlative to (or predictive of) valve lash 80 and/or valve lash 80 drift as desired.

Figure 6:
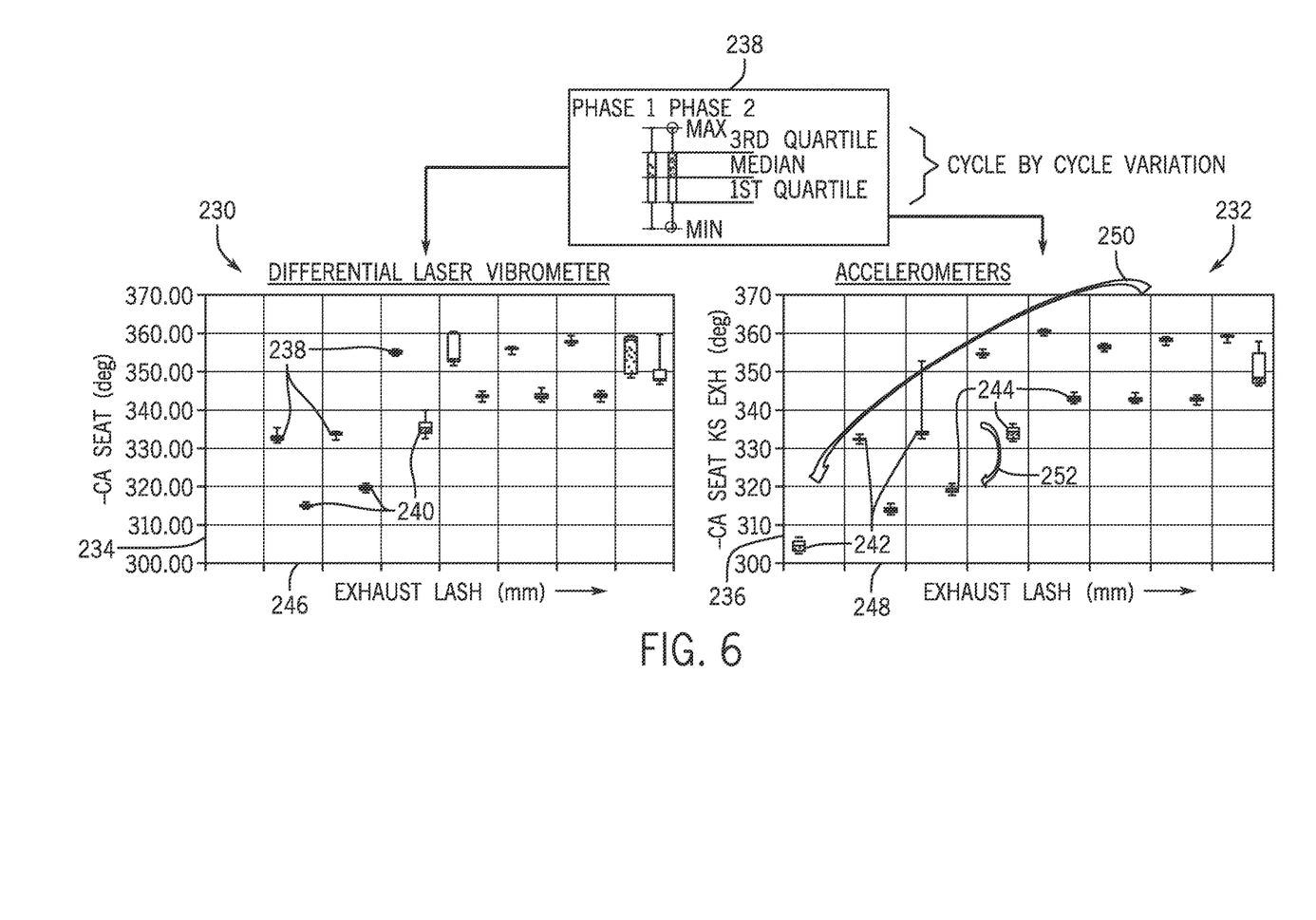
FIG. 6 illustrates an embodiment of charts depicting correlation between valve lash in operation and closing crank angle captured by valve lift measurement (left chart), and crank angle triggered on knocking sensor at a cylinder head (right chart)

Advantageously, it has been observed that adding crank angle data (e.g., data derived via sensor 66) to the data of graphs 200 and 206 may improve predictive accuracy. Accordingly, FIG. 6 shows embodiments of graphs 230, 232 that incorporate crank angle measurements. More specifically, graph 230 includes closing crank angle degree (e.g., measured by laser vibrometer) in a y-axis 234, while graph 232 also includes closing crank angle degree (e.g., measured by trigger knocking sensor signal) in a y-axis 236. Also shown is a legend 238 that depicts max, min, and quartiles (e.g., over a population of 100 thermodynamic cycles) for boxes 238, 240, 242, 244 of the graphs 230 and 232 (statistically representative of stationary engine operation).

Crank angle measurements may provide for enhanced accuracy, including predictive accuracy of exhaust lash and/or lash drift shown in x-axes 246, 248. For example, long term lash drift tendencies 250 and/or short term drift (e.g., stem 72 removal) 252 may be more easily derived. In certain embodiments, the data used to derive graphs 100, 102, 200, 206, 230, and/or 232 may be used to construct certain models or graphs suitable for acquiring crank angle data via the crank angle sensor 66 and engine noise data via the knock sensor(s) 23, and for deriving certain engine conditions useful, for example, in condition based maintenance based on the data acquired, such as the graphs or models shown with respect to FIGS. 7 and 8.

Figure 7:
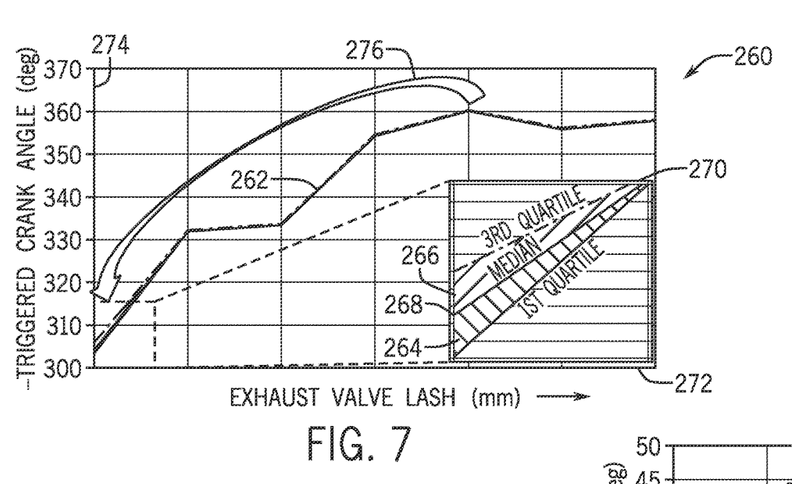
FIG. 7 illustrates an embodiment of a chart suitable for condition based maintenance of the engine of FIG. 1.

Turning now to FIG. 7, the figure shows an embodiment of a model 260 (e.g., threshold valve lash model) that may be suitable for condition based maintenance. The model 260 may be provided as computer instructions or code stored in the memory 74 and executable by the processor 72. The model 260 may also be stored and executed by external systems, such as external computing systems. In the depicted embodiment, the model 260 may be created by various techniques, such as mathematical techniques suitable for analyzing the data of graphs 100, 102, 200, 206, 230, and/or 232. For example, curve fitting techniques (e.g., polynomial curve fitting, least square regression analysis, linear interpolation, non-linear interpolation), data mining techniques (e.g., data cluster analysis, k-mean analysis), regression analysis and the like, may be used to transform the sensor 23, 66 data into the model 260

As depicted, the model 260 includes a graph or curve 262 having statistical quartiles 264, 266 suitable for expressing median 268 values and deviations from the median 268. For example, a detail section 270 of the model is shown, having the first quartile 264, third quartile 266, and median 268. Indeed, the model 262 may provide for enhanced analysis by enabling a data point to be identified as a median or quartile data point, or point outside of the curve 262. The model 260 includes an x-axis 272 representative of a hot valve lash or current valve lash 80 (e.g., in mm) present during engine operations. The model 260 additionally includes a y-axis 274 representative of triggered crank angle degrees. In use, knock sensor 23 data may be used to determine that certain valve train 70 dynamics have occurred. For example, decay portion 114 of FIG. 4 shows that certain valve train 70 dynamics have occurred related to the valve train 70. The crankshaft sensor 66 may then be used to determine the crank angle at which the dynamics occurred. Given the crank angle (e.g., statistically determined by triggering the accelerometer sensors), the curve 262 may be used to derive the hot valve lash or valve lash 80 present during current engine 10 operations. For example, a horizontal line from the y-axis at the measured crank angle may be drawn to intersect with the curve 262, and the intersection point may then correspond to the valve lash 80 currently present. Accordingly, noise may be detected and analyzed to determine the current exhaust valve lash 80 (e.g., point in the x-axis 272). Additionally, the current exhaust valve lash 80 may be found to be a median quartile valve lash, first quartile valve lash, or second quartile valve lash based on where the point falls in the first quartile 264, third quartile 266, and median 268.

As valve lash 80 adjustments are made, a user may log or otherwise save the valve lash adjustment. Valve drift may then be derived via the equation: valve drift=lash adjustment−hot lash. For example, as valve 62, 64 wears down during use, successive adjustments may be made and recorded. As each valve lash 80 adjustment is successively recorded, the model of FIG. 7 may be used to derive valve drift over time, for example, due to lash 80 reduction. For example, as lash 80 is reduced, a triggered crank angle may also drift lower in the combustion cycle, as shown by trend 276. Accordingly, a valve timing drift may be detected and condition based maintenance performed, for example to trigger service interval and balance the valve timing drift during engine lifetime. Indeed, instead of performing maintenance at a fixed schedule, the techniques described herein may monitor engine noise, detect a valve timing drift, and then alert or inform an interested party, or perform other actions (e.g., automatically adjust valve 62, 64 timing).

Likewise, lash 80 drift during operation may be detected as related to cylinder head 14 wear acceleration, overexpansion of valve train 70 components, loosened adjustment screw, and so on. Indeed, by triggering the engine noise to derive the hot valve lash 80 (e.g., x-axis), the model 260 may then be used to derive how the valve lash 80 may change over time due to valve lash drift. Such movements may then be applied to schedule the valve lash 80 adjustment, to detect rates of lash 80 consumption, to determine if the cylinder head 14 is wearing out as scheduled, and/or to determine if there may be overexpansion of valve train 70 components. Other models may also be created based on the techniques described herein.

Figure 8:
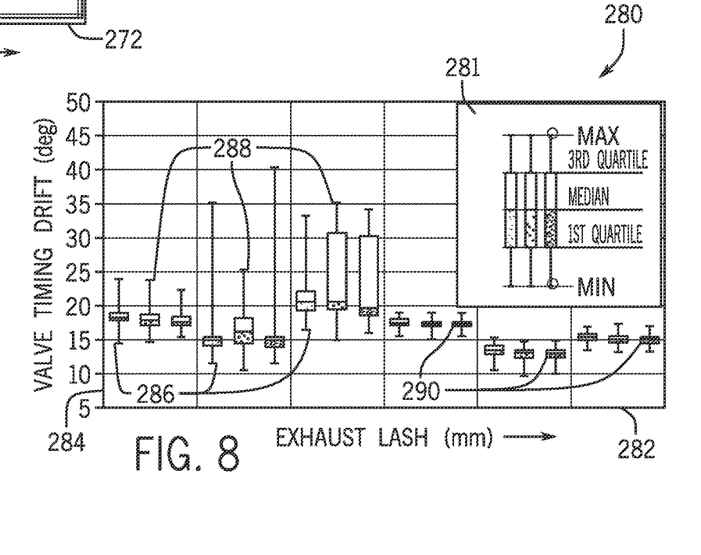
FIG. 8 illustrates an embodiment of a second chart suitable for condition based maintenance of the engine of FIG. 1.

For example, FIG. 8 illustrates an embodiment of a model 280 (e.g., valve timing change model) suitable for deriving a sudden valve timing change due to valve train structure failure, such as valve stem 72 disengage during engine 10 operations. The model 280 includes an x-axis 282 representative of the exhaust lash 80 measured in increasing mm. The model 280 also includes a y-axis 284 representative of valve 62, 64 timing drift measured in degrees. Box plots 286 are the variation of valve timing due to one valve disengagement derived via knock sensor 23 installed next to exhaust valve 64, boxes 288 are representative of data derived knock sensor 23 installed in proximity to intake valve 62, and boxes 290 are representative of data derived via a charge accelerometer bolted on the cylinder head. As illustrated, the trigger crank angle of the cylinder head acceleration signal may be sensed and used to determine sudden valve train failure, actual valve lash (x coordinate on x-axis 282), and likewise, a valve timing drift (y coordinate on y-axis 284) may be derived, and by correlating the current lash with the valve timing, a determination may be made if the boxes 286, 288, 290 includes a point having the x, y coordinate. If so, then it is likely that the valve stem 72 has been disconnected. The closer valve timing drift falls on a box's (e.g., box 286, 288, 290) median then the more likely the occurrence of the disconnection event. In other words, a rapid change in valve timing may be detected by applying statistical analysis on the cylinder head acceleration signal, for example, to curve 262. Indeed, if during engine operations the hot lash valve derived via curve 262 is found to have varied by a certain amount (e.g., between 1-2 mm, 0.5-4 mm, or more) at a certain time (e.g., between 0.5 and 10 seconds, 0.05 and 10 minutes, or more).

Technical effects of the invention include applying noise sensor data, such as knock sensor data, to create one or more models suitable for deriving valve drift. In one embodiment, the one or more models may then be used to provide for condition based maintenance (CBM) of an engine. For example, the one or more models may monitor engine noise, detect a valve timing drift, and then alert or inform an interested party, or perform other actions (e.g., automatically adjust valve timing). Likewise, lash consumption may be detected as related to cylinder head wear acceleration and/or overexpansion of valve train 70 components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system comprising:
an engine control system configured to control an engine, wherein the engine control system comprises a processor configured to:
receive a vibration signal sensed by a knock sensor disposed in an engine;

receive a crankshaft signal sensed by a crank angle sensor disposed in the engine, wherein the crankshaft signal is representative of an engine crank angle; and monitor a valve timing by deriving a cylinder head acceleration measurement via the vibration signal received by the knock sensor, wherein the processor is configured to monitor the valve timing by deriving a valve lash based on the vibration signal, the engine crank angle, and a threshold valve lash model, wherein the processor is configured to derive a valve train condition by executing a valve timing change model.

2. The system of claim 1, wherein the threshold valve lash model comprises a graph having a valve lash measure disposed on an x-axis and a triggered crank angle measure disposed on a y-axis, wherein the valve lash measure is derived based on the vibration signal and the triggered crank angle measure is derived based on a crank angle sensor.

3. The system of claim 2, wherein the threshold valve lash model comprises a first quartile range, a third quartile range, and a median, wherein the threshold valve lash model comprises a statistical analysis of the cylinder head acceleration over a population of cycles representative of a continuous operation of the engine, and wherein the processor is configured to derive the valve lash by plotting a triggered crank angle via the y-axis to determine if the valve lash comprises a median quartile valve lash, first quartile valve lash, or third quartile valve lash.

4. The system of claim 1, wherein the processor is configured to derive a valve timing drift by applying the valve lash and a valve adjustment measure.

5. The system of claim 1, comprising deriving a maintenance condition based at least on the valve lash, wherein the maintenance condition comprises a valve lash consumption due to a cylinder head accelerated wear, a valve train component overexpansion, loose adjustment screw or a combination thereof.

6. The system of claim 1, wherein the valve timing change model comprises a graph having a valve timing drift on an y-axis and a valve lash measure on an x-axis, wherein the valve lash measures is derived based on the vibration signal.

7. The system of claim 6, wherein the valve train condition comprises a disengagement of a valve, and wherein the disengagement is derived by plotting the exhaust lash against the valve timing drift.

8. The system of claim 1, wherein the knock sensor comprises a Piezo-electric accelerometer, a microelectromechanical system (MEMS) sensor, a Hall effect sensor, a magnetostrictive sensor, or a combination thereof, and wherein the engine control system comprises an engine control unit (ECU) having the processor, wherein the knock sensor ECU is configured to detect an engine knock via the knock sensor.

9. A method, comprising:
sensing an engine vibration via a knock sensor;
sensing an engine crank angle via a crank angle sensor; and
monitoring a valve timing by deriving a cylinder head acceleration measurement via the engine vibration sensed by the knock sensor, wherein deriving cylinder head acceleration measurement comprises deriving a valve lash based on the sensed engine vibration, the engine crank angle, and a threshold valve lash model, wherein the threshold valve lash model comprises a graph having a valve lash measure disposed on an x-axis and a crank angle measured disposed on a y-axis, wherein the valve lash measure is derived based on the vibration signal and the crank angle is derived based on a crank angle sensor.

10. The method of claim 9, comprising creating the threshold valve lash model by deriving a first natural frequency of the sensed engine vibration.

11. The method of claim 10, comprising creating the threshold valve lash model by analyzing a dynamic response of a valve seating about a cylinder head based on the natural frequency of the sensed engine vibration and a phase of the natural frequency.

12. The method of claim 11, comprising creating the threshold valve lash model by correlating the engine crank angle to the sensed engine vibration.

13. The method of claim 9 wherein the threshold valve lash model comprises a first quartile range, a third quartile range, and a median, wherein the threshold valve lash model comprises a statistical analysis of the cylinder head acceleration over a population of cycles representative of a continuous operation of the engine, and wherein the processor is configured to derive the valve lash by plotting a triggered crank angle via the y-axis to determine if the valve lash comprises a median quartile valve lash, first quartile valve lash, or third quartile valve lash.

14. A tangible, non-transitory computer readable medium storing code configured to cause a processor to:
receive a vibration signal sensed by a knock sensor disposed in an engine;
receive a crankshaft signal sensed by a crank angle sensor disposed in the engine, wherein the crankshaft signal is representative of an engine crank angle; and
monitor a valve timing by deriving a cylinder head acceleration measurement via the vibration signal received by the knock sensor, wherein the processor is configured to monitor the valve timing by deriving a valve lash based on the vibration signal, the engine crank angle, and a threshold valve lash model, wherein the threshold valve lash model comprises a graph having a valve lash measure disposed on an x-axis and a crank angle measured disposed on a y-axis, wherein the valve lash measure is derived based on the vibration signal and the crank angle is derived based on a crank angle sensor.

15. The computer readable medium of claim 14, comprising code configured to cause the processor to create the threshold valve lash model by deriving a first natural frequency of the sensed engine vibration.

16. The computer readable medium of claim 15, comprising code configured to cause the processor create the threshold valve lash model by analyzing a dynamic response of a valve seating about a cylinder head based on the natural frequency of the sensed engine vibration and a phase of the natural frequency, and by correlating the engine crank angle to the sensed engine vibration.

17. The computer readable medium of claim 14, wherein the threshold valve lash model comprises a first quartile range, a third quartile range, and a median, wherein the threshold valve lash model comprises a statistical analysis of the cylinder head acceleration over a population of cycles representative of a continuous operation of the engine, and wherein the processor is configured to derive the valve lash by plotting a triggered crank angle via the y-axis to determine if the valve lash comprises a median quartile valve lash, first quartile valve lash, or third quartile valve lash.

* * * * *